July 12, 1927.
R. H. WHITE
1,635,597
GROUTER ATTACHMENT FOR TRACK BELT LINKS
Filed Nov. 14, 1925
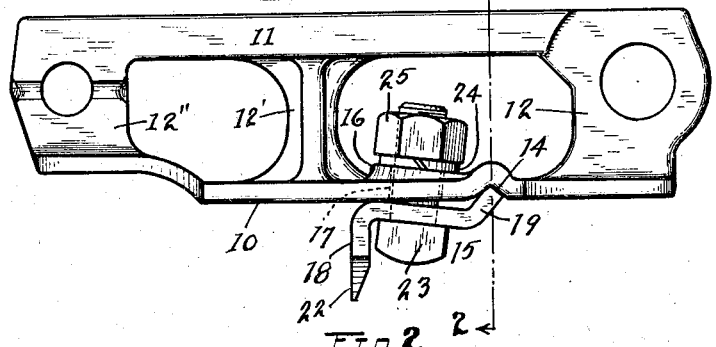
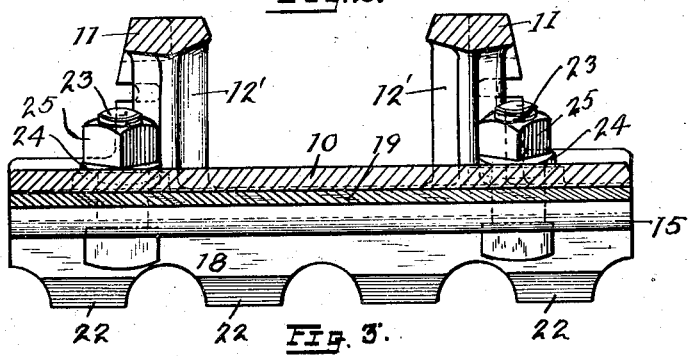
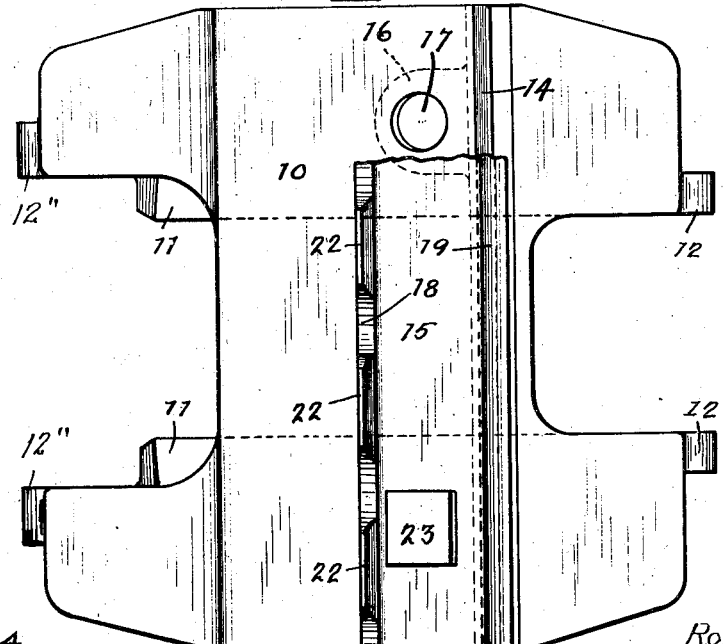
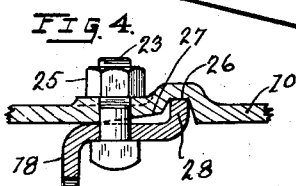
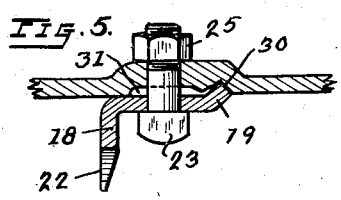
Rollin H. White
INVENTOR
W M Hart
ATTORNEY Patented July 12, 1927.

1,635,597

UNITED STATES PATENT OFFICE.

ROLLIN H. WHITE, OF CLEVELAND HEIGHTS, OHIO.

GROUTER ATTACHMENT FOR TRACK BELT LINKS.

Application filed November 14, 1925. Serial No. 69,132.

This invention relates to track belts for track laying tractors, and more especially to grouter attachments for the links comprising the track belts.

When track laying tractors are to be operated upon various types of surfaces, it is sometimes more desirable that the tracks be equipped with grouters, at other times with rubber treads, and some times with neither grouters or rubber treads. In order that a track can be utilized for all such conditions grouters and rubber tread units are provided which can be readily attached or detached from the shoe portion of the links.

Considerable difficulty is encountered in securing such attachments to links so that they will not become loose during the operation of a tractor, and it is an object of this invention to provide removable grouters for track links which are secured together so that there will be no relative movement thereof either longitudinally or laterally.

A further object resides in a novel form of grouter which can be attached with a shoe so that securing bolts will not be subjected to the entire strains and stresses which are encountered during the forward, rearward and turning movements of the tractor.

Still another object of the invention resides in the combination of a link and a grouter which are constructed so that they can be readily assembled and separated.

These and other objects, and the invention itself will be set forth in the following detailed description of one embodiment of my invention.

In the accompanying drawings, Figure 1 is a side elevation of a track link with a grouter secured thereto; Fig. 2 is a vertical sectional view of the same taken on line 2—2 of Fig. 1; Fig. 3 is a bottom plan view of a track link having a fragmentary portion of the removable grouter secured thereto; Fig. 4 is a longitudinal sectional view of a modified form of grouter attached to a fragmentary portion of a modified form of shoe; and Fig. 5 is a longitudinal sectional view of a modified form of grouter attached to another modified form of shoe.

Referring now to Figs. 1 to 3 by characters of reference, 10 represents the shoe portion of a track link and 11 the side rails which are supported in parallel relation in a plane above the shoe by side members 12, 12', and 12". The end side members 12 and 12" and the ends of the rails 11 are of such widths that their exterior width at one end is substantially the same as the interior width at the other end, so that the ends of adjacent links will telescope and can be pivotally secured together to provide an endless belt. The shoe 10 forms the tread portion of the link and bears upon the ground or road surface, and the rails 11 support the track rollers of a track laying tractor in the conventional manner.

The shoe portion of the link is provided with an angular groove 14 which extends transversely thereacross and in the bottom surface thereof. The groove is arranged approximately midway between the center and one end of the shoe and serves as a seat for one end of the removable grouter 15. The shoe is also provided adjacent each side with an upstanding boss 16 and an aperture 17 is provided through each boss and the shoe therebeneath. Such apertures 17 are preferably formed to extend at an angle which is inclined toward the forward end of the shoe at the bottom and the rear end of the shoe at the top.

The grouter 15 is preferably formed from a strip of pressed metal, and is bent downwardly at one end to provide a ground engaging element 18 and is bent upwardly at an obtuse angle at the other end to form a bearing element 19. The base of the grouter 15 intermediate the bent end elements 18 and 19 is provided with an aperture adjacent each end arranged so that they will align with the apertures 17 in the shoe. The grouter is preferably of a length to extend substantially entirely across the shoe and with the ground engaging element 18 located midway of the length of the shoe when the grouter is attached. The ground engaging element 18 of the grouter is provided with spaced teeth 22 which adapt the grouter especially for use on ice and snow, but it is understood that the ground engaging element may be formed as desired.

To assemble the grouter with the shoe, the upturned end 19 is seated in the groove 14 in the shoe surface, and the grouter while in such position is moved so that the apertures adjacent each end are in alignment with the apertures 17 in the shoe. Bolts 23 are then inserted through the aligned apertures in the grouter and shoe and washers 24 are placed around the ends of the bolts projecting through the bosses 16, and nuts 25 are screwed upon the ends of the bolts to tightly clamp the grouters against the shoe. By removing the nuts the grouter can be readily detached from the link.

It will be seen that the base of the grouter extends at an angle to the shoe due to the forward end of the grouter and the element 19 serving as the bearings so that when the bolt is drawn up by screwing the nut thereon, the base will spring upwardly and insure a tight connection. The apertures are inclined in the embodiment described so that the bolts will extend at right angles to the base portion of the grouter intermediate to the bent ends 18 and 19.

In Fig. 4 the link shoe 10 is formed with a groove 26 having an angular recess 27 extending forwardly therefrom, and the bearing portion 28 of the grouter is bent at right angles to the base portion. The bolts in this instance extend at right angles to the base of the shoe and the base of the grouter extends parallel to the major surface of the shoe bottom.

In Fig. 5 the shoe 10 is provided with a groove 30 similar to that shown in the first described embodiment and with a recess 31 in advance thereof. The grouter is substantially the same as that first described.

In all of the embodiments illustrated, the grouters only bear against the shoes adjacent their downturned forward end portions and at their upturned bearing ends. It will be seen that the major base portions of the grouters are spaced from the shoes so that there will be no large abutting surfaces which might rust together, thus permitting the grouters to be readily removed after use. It will also be seen that when the nuts are screwed upon the bolts to secure the grouter, that the grouter will be sprung toward the shoe, intermediate the groove and the bolts, thus making a tight connection. The arrangement of having the downturned forward end portion and the upturned end bearing portion of the grouter serve as bearings will relieve the bolts of strains which tend to cause a shearing action thereupon, the upturned bearing element of the grouter functioning with such result during rearward and during forward movement of a tractor.

Various changes can be made in the structure described without departing from the spirit of my invention and the scope of what is claimed.

What I claim is:—

1. The combination of a track link having a transversely grooved shoe portion; a grouter having a base portion terminating at one end in a depending traction element and at the other end in an upwardly extending bearing element; and means for removably clamping said grouter with said link shoe, said bearing element of the grouter being seated in the groove in said shoe and the major portion of the grouter base being spaced from the shoe when assembled therewith.

2. The combination of a track link having a transversely grooved shoe portion, said shoe having apertures therein at one side of said groove; a grouter formed of resilient metal, said grouter including a base portion having an upwardly extending bearing element at one end, said bearing element being seated in the groove in said shoe when assembled therewith and said base bearing against said shoe at the end opposite said bearing element; and means intermediate the ends of said grouter base for securing it to said shoe, said means causing a portion of said grouter base to yield toward said shoe.

3. The combination of a track link having a grooved shoe portion, a detachable grouter having longitudinally spaced bearing portions engaging against said shoe, and a bolt extending through said grouter intermediate said bearing portions of said grouter and through said shoe for removably securing said grouter tightly against said shoe, a laterally extending one of said bearing portions being disposed within a groove of the shoe portion to guard the bolt against lateral shearing thrusts of the grouter relative to the shoe.

In testimony whereof I affix my signature.

ROLLIN H. WHITE.